United States Patent
Lutz

(10) Patent No.: US 7,032,255 B2
(45) Date of Patent: Apr. 25, 2006

(54) WASTE HOLDING TANK FOR A MOBILE TOILET SYSTEM AND MOBILE TOILET SYSTEM

(76) Inventor: Helmut Lutz, Karlsruher-Strasse 30, Gaggenau (DE) D-76571

( * ) Notice: Subject to any disclaimer, the term of this patent is extended or adjusted under 35 U.S.C. 154(b) by 150 days.

(21) Appl. No.: 10/762,045

(22) Filed: Jan. 21, 2004

(65) Prior Publication Data

US 2004/0148687 A1    Aug. 5, 2004

Related U.S. Application Data

(63) Continuation of application No. 10/323,371, filed on Dec. 18, 2002, now abandoned.

(30) Foreign Application Priority Data

Dec. 19, 2001   (DE)   ................ 101 64 756

(51) Int. Cl.
*E03D 1/00*   (2006.01)
(52) U.S. Cl. .......................................... 4/321
(58) Field of Classification Search ............ 4/321–323; 220/745
See application file for complete search history.

(56) References Cited

U.S. PATENT DOCUMENTS

| | | | | |
|---|---|---|---|---|
| 4,042,981 A | 8/1977 | Cook | ............... | 4/10 |
| 4,805,660 A * | 2/1989 | Antos et al. | ............... | 137/202 |
| 4,926,508 A * | 5/1990 | Sargent et al. | ............... | 4/329 |
| 5,342,516 A | 8/1994 | Rachak | ............... | 210/218 |
| 5,363,510 A | 11/1994 | Chlebek | ............... | 4/321 |
| 5,557,810 A * | 9/1996 | Antos et al. | ............... | 4/321 |
| 5,702,026 A * | 12/1997 | Lindquist | ............... | 220/745 |
| 5,924,141 A | 7/1999 | Fransson | ............... | 4/111.1 |
| 6,189,161 B1 | 2/2001 | Rijn et al. | ............... | 4/321 |
| 6,397,407 B1 * | 6/2002 | Dahlberg | ............... | 4/431 |

FOREIGN PATENT DOCUMENTS

| | | |
|---|---|---|
| CA | 1 096 552 | 3/1981 |
| DE | 199 25 898 | 12/2000 |

\* cited by examiner

*Primary Examiner*—Charles E. Phillips
(74) *Attorney, Agent, or Firm*—Harness, Dickey & Pierce, P.L.C.

(57) ABSTRACT

A waste holding tank for a mobile sanitary toilet system includes a base section, a bowl section supported by the base section and a waste holding tank. The tank includes a housing defining a tank interior and a tank exterior. A vent opening is located at a first location of the housing. The opening forms a fluid communication between the interior and the exterior of the tank. A vent conduit connects the vent opening on the tank exterior at the first location with the exterior of the tank at a second location of the housing. The vent conduit leads at least partly through the interior of the tank without being in fluid communication with the interior of the tank.

33 Claims, 5 Drawing Sheets ated Dec. 19, 2001, which application is herein expressly incorporated by reference.

WASTE HOLDING TANK FOR A MOBILE TOILET SYSTEM AND MOBILE TOILET SYSTEM

CROSS-REFERENCE TO RELATED APPLICATION

This application is a continuation of U.S. Ser. No. 10/323,371 filed on Dec. 18, 2002 now abandoned which claims priority to German Patent Application No. 10164756.5 filed Dec. 19, 2001, which application is herein expressly incorporated by reference.

BACKGROUND AND SUMMARY

The invention relates to a waste holding tank for a sanitary toilet system, in particular, a mobile sanitary toilet system, the toilet system comprising a base section, a bowl section supported by the base section and a waste holding tank, the tank comprising a housing, the housing defining a tank interior and a tank exterior and comprising a vent opening at a first location of the housing, the opening forming a fluid communication between the interior and the exterior of the tank.

Furthermore, the invention relates to a sanitary toilet system, in particular, a mobile sanitary toilet system comprising a base section, a bowl section supported by the base section and a waste holding tank.

Mobile toilet systems of the kind as mentioned above are used in vehicles, e.g. mobile homes, caravans, boats, coaches etc. In such vehicles attempts have been made in the past to reduce the irritation by odors resulting from the formation of bacteria in the waste holding tank by using chemicals. Despite these endeavors, there is generally, and particularly strongly on hot summer days, a very strong and unpleasant irritation due to odors.

An improved venting system for a mobile toilet system is disclosed in DE 199 25 898 A1. To overcome the problems indicated above, it is proposed to connect the vent opening with a suction device when the tank is inserted in the mobile toilet system. Since the vent opening of commonly used tanks is located on the top side of the tank, a conduit is required to connect the vent opening and the suction device leading through a side wall of the base and also through a sidewall of the vehicle. This individually required adaptation of the mobile toilet system to different vehicle situations involves intensive installation efforts with respect to cost and time.

Therefore, it is an object of the present invention to provide a waste holding tank for a mobile toilet system and a mobile toilet having an improved and easily installable venting system.

This object is accomplished in accordance with the invention in a waste holding tank of the type described at the outset in that a vent conduit is provided for connecting the vent opening on the tank exterior at the first location with the exterior of the tank at a second location of the housing, the vent conduit leading at least partly through the interior of the tank without being in fluid communication with the interior of the tank.

The advantage of the inventive solution is that no additional installation work is required for a perfect venting of the tank. The foul gases can easily be led through the vent opening and through the vent conduit to the second location on the exterior of the tank, e.g., on a side wall or the bottom side of the tank. If the tank is inserted into the mobile toilet system, the vent conduit according to the present invention forms a shortcut for the foul gases from the interior of the tank to the exterior at the second location where the tank could easily be connected with the outside of the vehicle, with or without an optional suction device. If the conduit leads at least partly through the interior of the tank, the conduit could be formed partly by the tank itself and partly by a second member, e.g., a part of the base section forming another part of the vent conduit. Such a construction would allow the foul gases to be led along the exterior of the tank to a location where the vent conduit could easily be connected with the exterior of the vehicle and/or the exterior of the room where the toilet system is located.

In a preferred embodiment of the invention, it is provided that the vent conduit leads completely through the interior of the tank. Such a construction requires the least sealing efforts compared to a vent conduit leading at least partly through the interior of the tank. Furthermore, the tank according to the present invention is adapted to be introduced into mobile toilet systems which are already in use.

Preferably, the first location is on the top side of the housing. Such an arrangement reduces the risk of the content of the tank reaching the vent conduit through the vent opening and avoids a contamination of the vent conduit.

Furthermore, it is advantageous when the second location is on the bottom side of the housing. According to this arrangement, the vent conduit could be formed as short as possible, i.e., having a minimal length. Additionally, no extra installations leading around the tank are required to connect the vent opening with the bottom side of the tank.

In principle, it would be possible for the vent conduit to be formed by a plurality of conduits. Preferably, the vent conduit comprises a channel having a first end and a second end. A channel of this kind reduces the number of connections which have to be sealed to a minimum.

According to a preferred embodiment of the invention, the channel is formed by a tube extending vertically through the tank. Such a tank is easy to produce since only two openings have to be formed, one on the top side and another one on the bottom side of the tank. The tube can easily be inserted through the openings so as to form a passage through the interior of the tank and allow the waste air to leave the tank and to be guided through the interior of the tank to the exterior without coming into contact with the waste contained in the tank.

To prevent waste air from escaping from the tank when the tank is, for example, in a stored position outside the mobile toilet system, a closure is provided, the closure opening the vent opening in an open position and closing the vent opening in a closed position. Such closure additionally holds back the contents of the tank to avoid a splashing of the contents when the vehicle is moved and a contamination of the vent conduit.

In principle, the closure could be electrically actuatable. According to a preferred embodiment of the invention, however, the closure is mechanically actuatable. This allows opening of the vent opening automatically or manually when a venting of the tank is required.

Although the closure could be formed by a cover or a screw cap, it is beneficial for the closure to be formed by a valve.

In principle, the valve could be a simple valve. However, it is advantageous for the valve to be a safety valve. With such a valve, an unintentional opening of the vent opening can be avoided.

Since it is not guaranteed that the contents of the tank will not pass through the vent opening and contaminate the vent conduit when the closure is in the open position, it is preferable for the closure to comprise a movably supported float for reversibly opening and closing the vent opening in the open position of the closure. Such a float allows closing of the vent opening when the closure is in the open position. For example, the float can be actuated by the contents of the waste tank, i.e., if the tank fills up, the surface of the waste (the upper waste level) inside the tank forces the float to close the vent opening.

Although the closure could be actuated manually, it is advantageous for an actuation mechanism to be provided for reversibly moving the closure from the open position to the closed position. The actuation mechanism allows opening and closing of the closure automatically. In principle, the actuation mechanism could be actuated manually or automatically, e.g. electrically or by air pressure.

Although the actuation mechanism could be actuated manually, it is preferable to provide an automatic actuation of the closure. This could be advantageously realized in such a way that the tank is movable from an inserted position to a retracted position, the tank being inserted in the base section in the inserted position and being retracted from the inserted position in the retracted position, the actuation mechanism being actuatable by moving the tank from the retracted position to the inserted position. This allows an automatic opening and closing of the vent opening by inserting or retracting the tank into or out of the base section of the mobile toilet system.

In a preferred embodiment of the invention, the actuation mechanism comprises a movable actuation member supported by the tank and cooperating with an actuation element supported by the base section during the movement of the tank from the retracted position to the inserted position. Such a construction requires a minimum of movable parts since the actuation element need not be a movable member.

Preferably, the actuation member is arranged within the vent conduit and extends in the direction of the vent conduit. The arrangement of the actuation member within or at least partly inside the vent conduit provides protection of the actuation member against contamination and destruction. Furthermore, the actuation member could be completely hidden within the tank.

To improve the stability of the actuation member and also to increase the waste air flow through the vent conduit, the actuation member has a cross-shaped cross section.

Although the actuation element could be a movable member, e.g. a push button, it is preferable that the actuation element be formed by an inclination. This allows the actuation member to move or glide along a surface of the inclination which results in a movement of the actuation member in a direction transverse to the inclination.

In order to also provide an outlet for the waste air with a cross section of maximum size, the actuation element is formed by a web extending across a through-opening of the base section. This allows the waste air to pass bthe web and to flow through the through-opening of the base section. Furthermore, waste air flow is maximized.

Preferably, the closure is in the closed position when the tank is in the retracted position. Therefore, it is advantageous for the actuation mechanism to comprise a biasing member for biasing the closure in the closed position when the tank is in the retracted position. This avoids any leakage of the tank when the tank is in the retracted position, which, for example, could result in a contamination of the vent conduit.

In another preferred embodiment of the invention, the actuation mechanism comprises a pivotally supported transfer element interconnecting the actuation member and the closure. This allows an actuation force to be transmitted from a first direction to a second direction via the transfer element. For example, if the actuation member extends vertically through the tank and the vent opening is located on the top side of the tank, an up-and-down-movement of the actuation member has to be transmitted to an up-and-down-movement of the closure. This could be easily achieved with the transfer element.

In principle, the biasing member could be allocated to the closure itself or to the actuation member. However, it is preferable for the biasing member to be allocated to the transfer element. This allocation allows a reduction in the size of the biasing member and also exact adjustment of a biasing force.

The actuation mechanism could be easily hidden and protected if it is at least partially arranged in a recess formed on the exterior on the top side of the tank.

In order to conceal the actuation mechanism and form an impervious air passage between the vent opening and the vent conduit or the channel, according to a preferred embodiment of the invention it is provided that the recess is closed with a cover, the covered recess forming a second conduit, the second conduit being in fluid communication with the first end of the channel and the vent opening.

Preferably, the transfer element is arranged in the recess. This allows formation of a shallow recess, which has the advantage that almost the entire inner height of tank could be used for storing waste without the risk that the waste will splash through the vent opening and contaminate the vent conduit.

For further improvement of the venting system, a vent line connector is supported by the base section, the vent line connector being connected to the second end of the channel in the inserted position of the tank. This arrangement allows the waste air to be guided further outside the mobile toilet system, i.e. through the base section to the exterior of the toilet room or the vehicle in which the toilet system is located.

To avoid further unpleasant irritation by odors a sealing member is provided for sealingly connecting the vent line connector with the second end of the channel.

A very inexpensive and easy way to seal the vent line connector to the second end of the channel is for the sealing member to be formed by a foam sealing arranged around the vent line connector.

The vent line connector could be formed by a flange to be connected to a tube system leading the waste air to the outside of the toilet room or the vehicle. However, the vent line connector is preferably a hose connector. Hoses are adapted to fit in almost all situations in a vehicle, especially in caravans or motorhomes. Furthermore, hoses are very cheap and can easily be bent into a shape which is necessary to reach around corners and edges.

According to a further preferred embodiment of the present invention, the base section comprises an opening for passage of a third conduit connectable to the second end of the channel and/or the vent line connector. This offers the advantage that the waste air can be led through the vent opening and the vent conduit formed by the channel to the second end of the channel which can be connected to a vent line connector and through the third conduit to the exterior of the base section and further to the exterior of the toilet room and/or the vehicle.

In an advantageous embodiment of the present invention, a cavity is provided in the base section and the vent line connector extends into the cavity. This allows an easy connection of a further air guiding line to the vent line connector.

In special cases where it is not possible to lead the waste air to the exterior of the toilet room or the vehicle and even in cases which allow an air flow to the exterior, unpleasant irritation could be reduced or completely avoided by using a filter element. Preferably, the filter element is connectable to the vent line connector and locatable in the cavity. This allows easy changing of the filter element after retraction of the tank. Furthermore, the filter element is optimally stored and protected.

Furthermore, the object as mentioned above is achieved in accordance with the present invention with a mobile sanitary toilet system comprising a base section, a bowl section supported by the base section and a waste holding tank in that the system comprises a waste holding tank as described above.

BRIEF DESCRIPTION OF THE DRAWINGS

The following description of a preferred embodiment of the invention serves to provide a more detailed explanation, in conjunction with the drawings, in which.

DETAILED DESCRIPTION OF THE PREFERRED EMBODIMENTS

Figure 1:
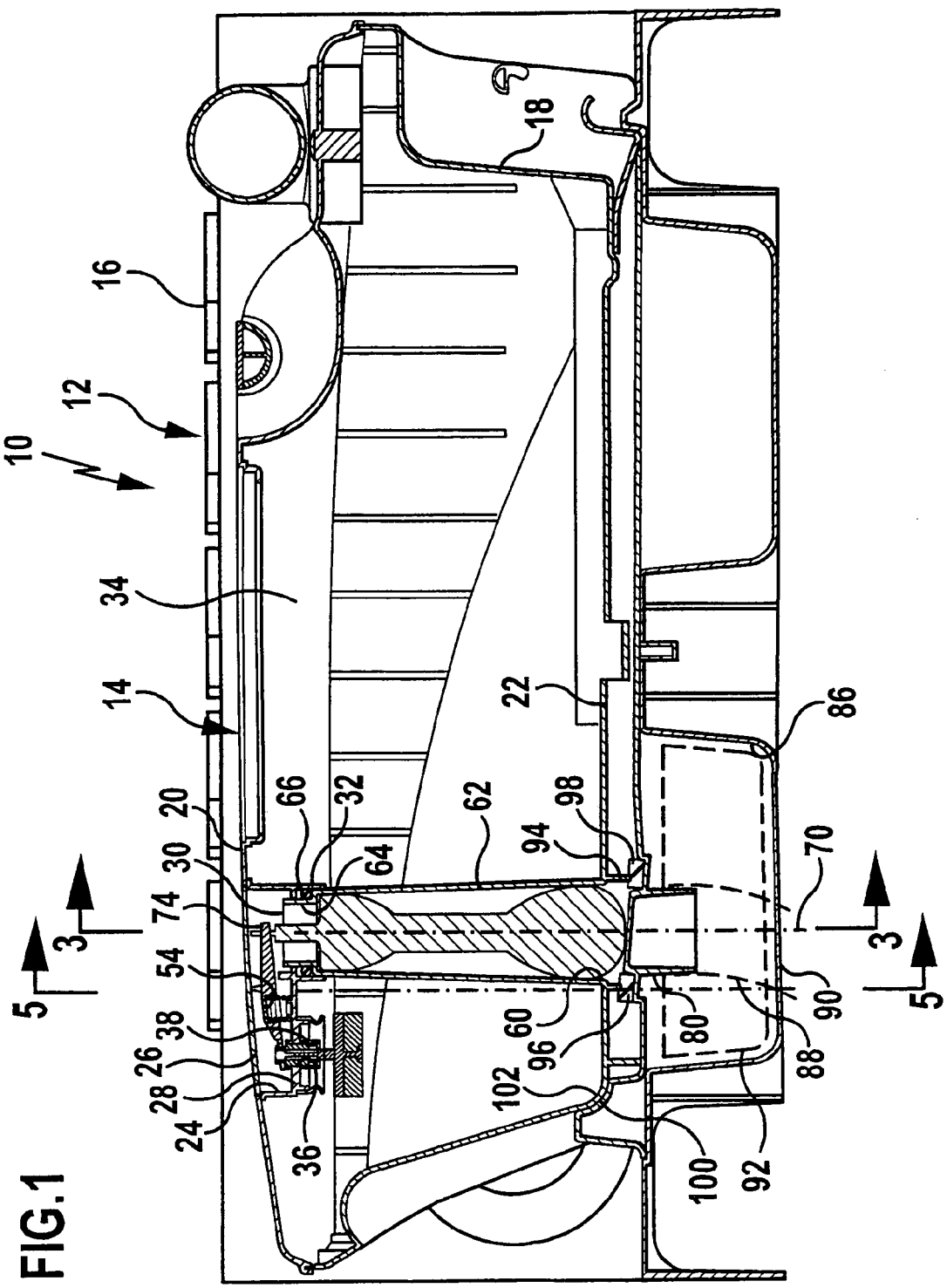
FIG. 1 is a cross-sectional view through a waste holding tank inserted in a base section of a mobile toilet system.

FIG. 1 shows a part of the mobile toilet system indicated at 10, namely a base section 12 and a waste holding tank 14 in an inserted position, i.e., completely inserted in a housing 16 formed in the base section 12.

The tank 14 comprises a housing 16 having a top side 20 and a bottom side 22. On the top side 20 of the housing 18 a block-shaped recess is formed and closed by a cover 26. A bottom plate 28 of the recess 24 is provided with a circular hole 30 which is surrounded by a tubular flange 32 extending into an interior 34 of the tank 14. A second circular hole 36 which is about three times smaller in diameter than the hole 30 is also provided in the bottom plate 28. The hole 36 is surrounded by a tubular section 38 extending into the interior 34.

The hole 36 serves as a vent opening of the tank 14 and contains a vent pivot 40 which is movable along an axis of the tubular section 38. The hole 36 and the vent pivot 40 form a valve unit for reversibly opening and closing the vent opening.

A vent lifter 42 forming a part of an actuating mechanism for lifting and lowering the vent pivot 40 comprises a bearing shaft 44 and a U-shaped first end 46 which is connectable with the vent pivot 40. For this reason, the vent pivot 40 comprises two vent flanges 48 and 49. The first end 46 engages between the flanges 48 and 49.

Figure 5:
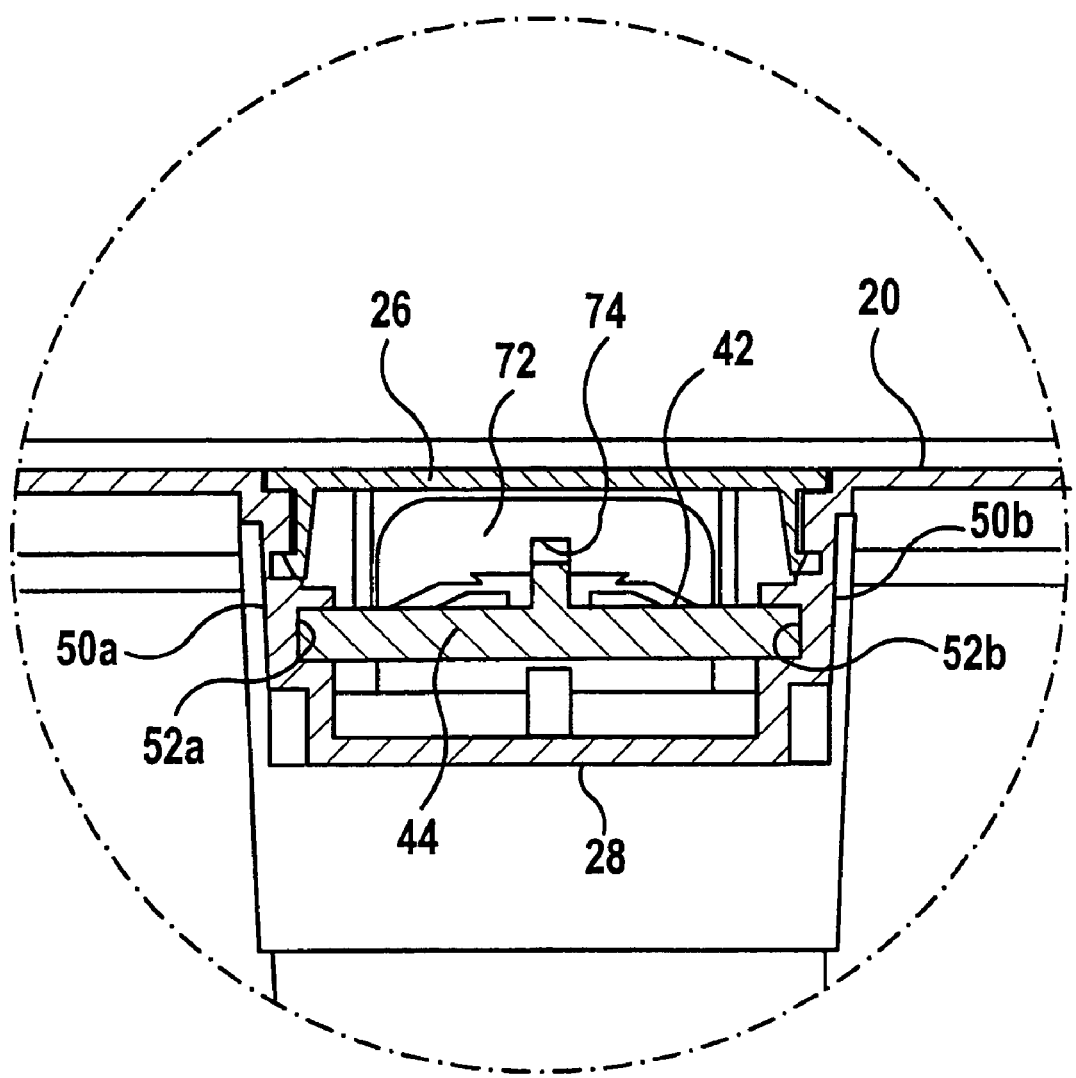
FIG. 5 is a cross-sectional view along line 5—5 in FIG. 1.

As shown in FIG. 5, sidewalls 50a and 50b of the recess 24 which comprise receptacles 52a and 52b for receiving ends of the shaft 44 form a hinge for the vent lifter 42. The axis of the shaft 44 extends parallel to the bottom plate 28 and transversely to a line connecting the holes 30 and 36. Furthermore, the vent lifter comprises a pot-shaped receptacle 54 for receiving a spring 56 which is held in position by a tubular spring locating section 58. The spring locating section 58 is arranged on the bottom plate 28 and extends in a direction towards the cover 26. The spring 56 is arranged between the bottom plate 28 and the vent lifter 42 such that the first end 46 of the vent lifter is forced towards the cover 26 for keeping the vent opening in an opened position.

A hole 60 is formed in the bottom side 22 of the tank 14 and connected with a tube 62 which extends vertically through the interior 34 of the tank 14 and reaches with a diameter-reduced tube section 64 through the hole 30. An O-ring 66 is fitted between the flange 32 and the tube section 64 for sealingly connecting the tube 62 to the bottom plate 28. The vent hole 36 in connection with the covered recess 24 and the tube 62 form a vent path for guiding waste air from the interior 34 of the tank 14 to the bottom side 22 of the tank 14 through the interior of the tank 34 without being in fluid communication with the interior of the tank 34.

Figure 3:
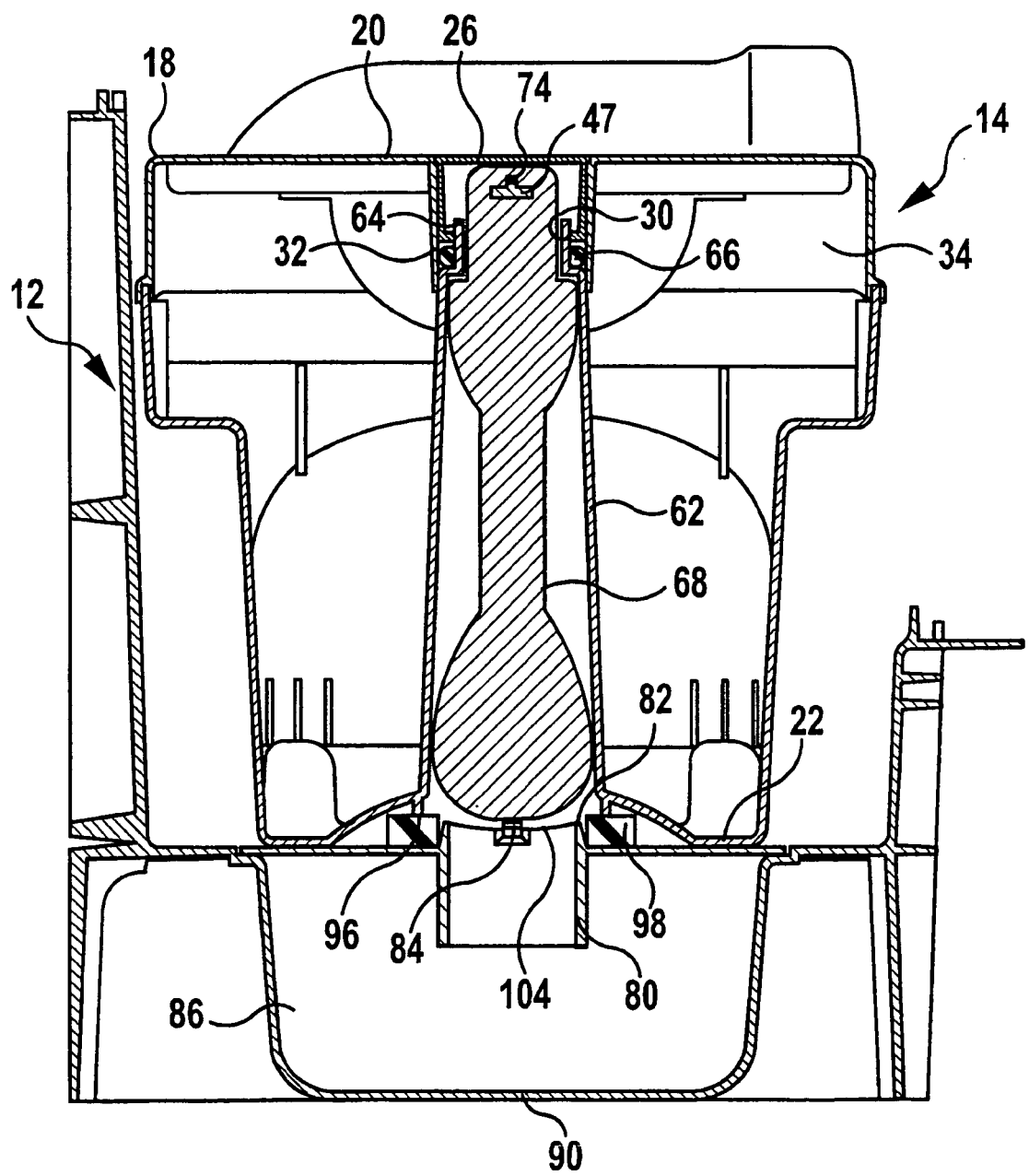
FIG. 3 is a cross-sectional view along line 3—3 in FIG. 1.
Figure 4:
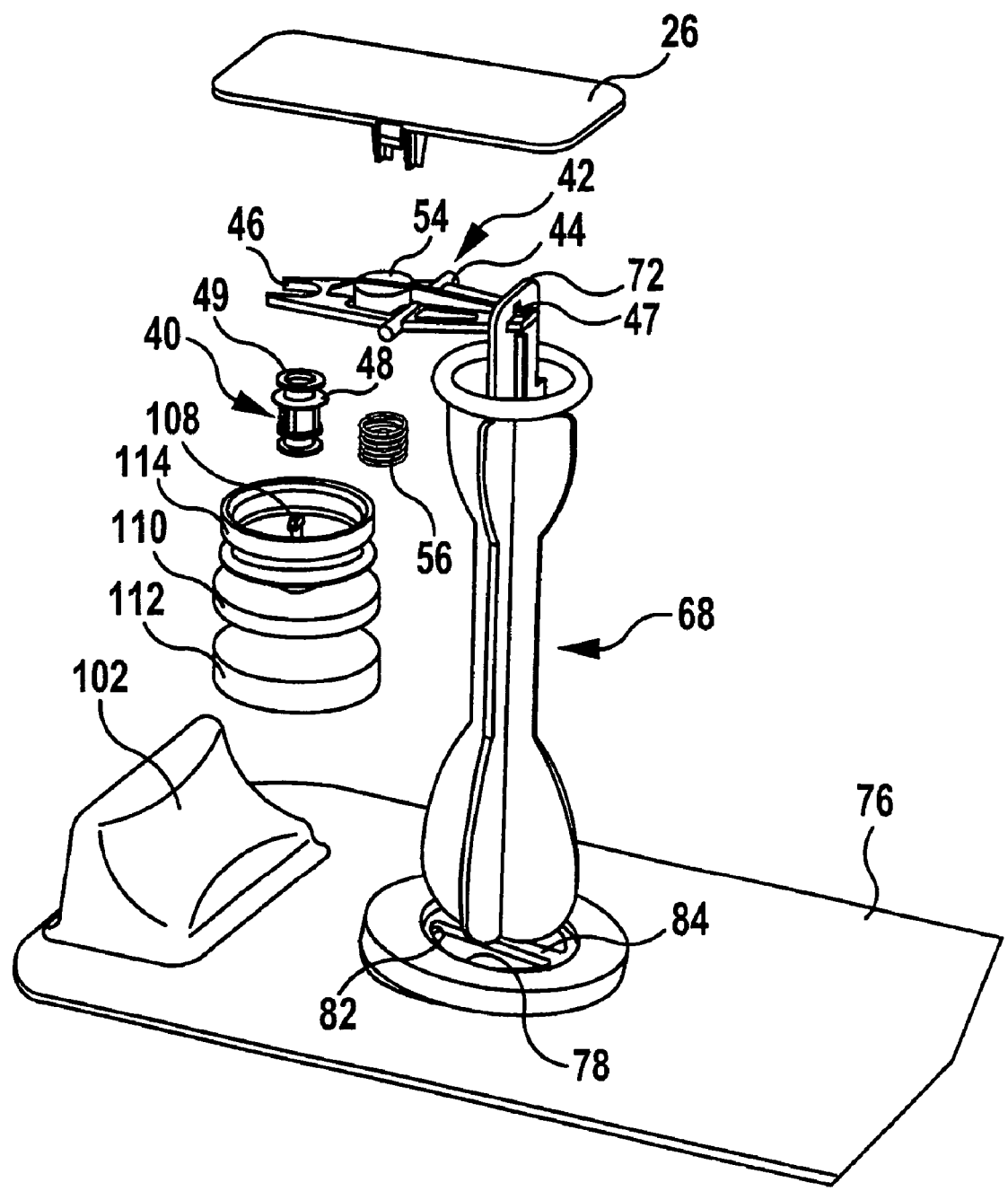
FIG. 4 is an exploded view of elements of an actuation mechanism.

A vent actuator 68 having a cross-shaped cross section is located within the tube 62 and movable along a tube axis 70. An upper end 72 of the vent actuator 68 comprising an opening 74 is adapted to receive a second end 47 of the vent lifter 42. A movement of the vent actuator 68 towards the cover 26 lifts the second end 47 of the vent lifter 42 towards the cover 26 and lowers the first end 46 of the vent lifter 42 at the same time against the biasing force of the spring 56. When the first end 46 of the vent lifter 42 is lowered, the vent pivot 40 is in a lowered position opening an air path through the hole 36 and through the vent pivot 40. This position, the so-called open or venting position, is shown in FIGS. 1 and 3.

Figure 2:
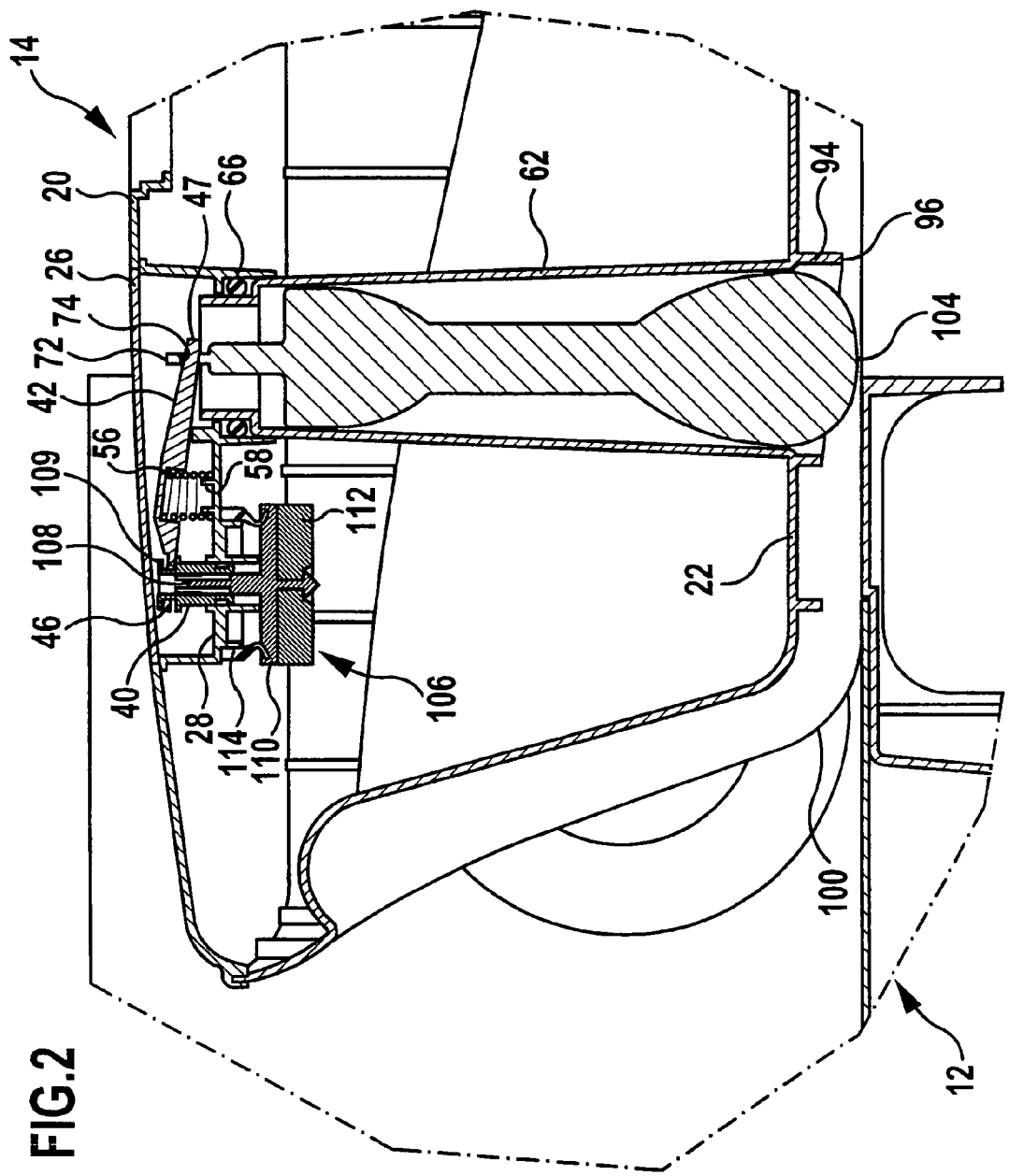
FIG. 2 is a sectional view of a part of a tank in a retracted position.

As shown in FIG. 2 where the tank 14 is in a retracted position, i.e., any position different from the inserted position shown in FIG. 1, the first end 46 of the vent lifter 42 is forced in a direction towards the cover 26 by means of the spring 56 so that the vent opening formed by the hole 36 is closed by the vent pivot 40. At the same time, the vent actuator 68 is forced into a lowered position.

For automatically actuating the vent actuator 68, a base plate 76 of the base section 12 has a circular opening 78 which is formed by a tubular-shaped hose connector 80. The upper edge 82 of the connector 80 extends towards the tank 14 and is inclined at about 10 to 15°. A web 84 extends over the opening 78 and is connected with the highest and the lowest sections of the edge 82. The web 84 is inclined in a direction parallel to the opening 74.

The connector 80 extends into a cavity 86 formed in the base plate 76. A hose 88 shown in dotted lines in FIG. 1 may be connected to the connector 80 and led through the bottom of the cavity 86 to the exterior, for example, of a toilet room or a vehicle.

Alternatively, a filter element 92 may be arranged within the cavity 86 and connected to the connector 80 for cleaning the waste air led through it.

For obtaining a sealed connection between the tank 14 and the base section 12, the hole 60 in the bottom side 22 of the tank 14 is prolonged with a tubular connector 94 having an inclined edge 96. The opening 78 is surrounded by a base plate seal 98 made of foam.

Before using the toilet system 10, the tank 14 has to be inserted into the housing 16 of the base section 12. During insertion, the tank 14 slides along the base plate 76 of the base section until a front edge 100 abuts a stop 102 formed on the base plate 76. During the insertion of the tank 14, a lower edge 104 of the vent actuator 68 slides along the inclined web 84 which results in a movement of the vent actuator 68 towards the cover 26. At the same time, the second end 47 of the vent lifter 42 lifts up and the first end 46 is lowered. In the inserted position of the tank 14 shown in FIG. 1, the vent opening is open and the waste air inside the tank 14 can flow through the hole 36 and the vent pivot 40, the covered recess 24, the tube 62 and the connector 80 and, for example, through a hose 88 to the exterior of the vehicle. Since both the edge 82 of the connector 80 and the edge 96 of the connector 94 are inclined, and the seal 98 surrounds the opening 78, the edge 96 contacts the seal 98 in such a way that air cannot leave the above-described vent path.

When the tank 14 is retracted from the inserted position, the vent actuator 68 moves away from the cover 26 and the biasing force of spring 56 results in a lifting-up of the first end 46 of the vent lifter 42. The vent opening is thereby automatically closed.

For closing the vent opening in the bottom plate 28 of the recess 24 when the vent pivot 40 is in the open position as shown in FIG. 1, a float 106 is provided. The float 106 comprises a float holder 108 which is slidably supported in a central bore 109 of the vent pivot 40. The float holder 108 carries a float stem 110 in the form of a disk whose one circular side is covered by a disk 112 of foam. In order to close an air path when the vent pivot 40 is in the open position, a vent seal 114 is arranged around the hole 36 having an inner diameter which is about three times larger than the diameter of the hole 36.

The float 106 is connected to the vent pivot 40 and forms a safety valve which closes the vent opening when the upper waste level inside the tank 14 rises above a certain level and comes into contact with the disk 112. As the waste level rises further, the disk 112 connected to the float stem 110 moves towards the cover 26 until the float stem 110 comes into contact with the vent seal 114. When the float 106 is actuated, it is impossible for waste to pass through the vent opening inside the recess 24, which would result in a contamination of the actuating member.

Construction of a waste holding tank 14 as indicated above, i.e., with an improved venting system, has a quadruple function.

First, it is possible to guide the waste air from the faeces out of the tank 14 through the interior 34 despite the waste located there. The location of the outlet for a waste air guide, e.g. the tube 62, can be chosen optimally and be adapted to the requirements of the base system, i.e., the vehicle or the toilet room.

Second, it is possible to install the necessary actuating mechanism for valve control in the vent conduit.

Third, the tank 14 can be easily transported since the vent opening is closed when the tank is in the retracted position.

And fourth, it is possible to change the function of the safety valve to a float when the actuating mechanism is activated, i.e., when the tank is in the inserted position.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A waste holding tank for a mobile sanitary toilet system, having a base section and a bowl section supported by the base section, the waste holding tank comprising:
    a housing, the housing defining a tank interior and a tank exterior;
    a vent opening at a first location of the housing, the vent opening forming a fluid communication between the interior and the exterior of the tank; and
    a vent conduit connecting the vent opening on the tank exterior at the first location with the exterior of the tank at a second location of the housing, the vent conduit leading at least partly through the interior of the tank without being in fluid communication with the interior of the tank.

2. The waste holding tank according to claim 1, wherein the vent conduit leads completely through the interior of the tank.

3. The waste holding tank according to claim 1, wherein the first location is on a top side of the housing.

4. The waste holding tank according to claim 1, wherein that second location is on a bottom side of the housing.

5. The waste holding tank according to claim 1, wherein the vent conduit comprises a channel having a first end and a second end.

6. The waste holding tank according to claim 5, wherein the channel is formed by a tube extending vertically through the tank.

7. The waste holding tank according to claim 1, wherein a closure is provided, the closure opening the vent opening in an open position and closing the vent opening in a closed position.

8. The waste holding tank according to claim 7, wherein the closure is mechanically actuatable.

9. The waste holding tank according to claim 7, wherein the closure is formed by a valve.

10. The waste holding tank according to claim 9, wherein the valve is a safety valve.

11. The waste holding tank according to claim 9, wherein the valve comprises a movably supported float for reversibly opening and closing the vent opening in the open position of the closure.

12. The waste holding tank according to claim 1, wherein an actuation mechanism is provided for reversibly moving the closure from the open position to the closed position.

13. The waste holding tank according to claim 12, wherein the tank is movable from an inserted position to a retracted position, the tank being inserted in the base section in the inserted position and being retracted from the inserted position in the retracted position, the actuation mechanism being actuatable by moving the tank from the retracted position to the inserted position.

14. The waste holding tank according to claim 12, wherein the actuation mechanism comprises a movable actuation member supported by the tank and cooperating with an actuation element supported by the base section during the movement of the tank from the retracted position to the inserted position.

15. The waste holding tank according to claim 14, wherein the actuation member is arranged within the vent conduit and extends in the direction of the vent conduit.

16. The waste holding tank according to claim 14, wherein the actuation member has a cross-shaped cross section.

17. The waste holding tank according to claim 14, wherein the actuation element is formed by an inclination.

18. The waste holding tank according to claim 14, wherein the actuation element is formed by a web extending across a through-opening of the base section.

19. The waste holding tank according to claim 14, wherein the actuation mechanism comprises a biasing member for biasing the closure in the closed position when the tank is in the retracted position.

20. The waste holding tank according to claim 14, wherein the actuation mechanism comprises a pivotally supported transfer element interconnecting the actuation member and the closure.

21. The waste holding tank according to claim 20, wherein the biasing ember is allocated to the transfer element.

22. The waste holding tank according to claim 12, wherein the actuation mechanism is at least partially arranged in a recess formed on the exterior on the top side of the tank.

23. The waste holding tank according to claim 22, wherein the recess is closed with a cover, the covered recess forming a second conduit being in fluid communication with the first end of the channel and the vent opening.

24. The waste holding tank according to claim 1, wherein the transfer element is arranged in the recess.

25. The waste holding tank according to claim 1, wherein a vent line connector is supported by the base section, the vent line connector being connected to the second end of the channel in the inserted position of the tank.

26. The waste holding tank according to claim 1, wherein a sealing member is provided for sealingly connecting the vent line connector with the second end of the channel.

27. The waste holding tank according to claim 26, wherein the sealing member is formed by a foam sealing arranged around the vent line connector.

28. The waste holding tank according to claim 25, wherein the vent line connector is a hose connector.

29. The waste holding tank according to claim 1, wherein a seal is provided for sealingly connecting the first end of the channel and the recess on the top side of the tank.

30. A Waste holding tank according to claim 1, wherein the base section comprises an opening for passage of a third conduit connectable to the second end of the channel and/or the vent line connector.

31. The waste holding tank according to claim 1, wherein a cavity is provided in the base section, and that the vent line connector extends into the cavity.

32. The waste holding tank according to claim 1, wherein a filter element is connectable to the vent line connector and locatable in the cavity.

33. The waste holding tank according to claim 1, in combination with the system.

* * * * *